(12) United States Patent
Marti et al.

(10) Patent No.: US 10,108,748 B2
(45) Date of Patent: Oct. 23, 2018

(54) MOST RELEVANT APPLICATION RECOMMENDATION BASED ON CROWD-SOURCED APPLICATION USAGE DATA

(71) Applicant: Apple Inc., Cupertino, CA (US)

(72) Inventors: Lukas M. Marti, Santa Clara, CA (US); Zehua Zhou, Sunnyvale, CA (US); Jeffrey Michael Bartunek, Sunnyvale, CA (US); Weili Shao, Redwood City, CA (US); Liviu Teodor Popescu, Sunnyvale, CA (US); Lili Cao, Sunnyvale, CA (US); Ronald K. Huang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 549 days.

(21) Appl. No.: 14/501,961

(22) Filed: Sep. 30, 2014

(65) Prior Publication Data

US 2015/0347437 A1     Dec. 3, 2015

Related U.S. Application Data

(60) Provisional application No. 62/005,967, filed on May 30, 2014.

(51) Int. Cl.
*G06F 17/30* (2006.01)
*G06Q 30/02* (2012.01)

(52) U.S. Cl.
CPC ...... *G06F 17/3097* (2013.01); *G06F 17/3053* (2013.01); *G06F 17/30867* (2013.01); *G06Q 30/02* (2013.01); *G06Q 30/0205* (2013.01); *G06Q 30/0282* (2013.01)

(58) Field of Classification Search
None
See application file for complete search history.

(56) References Cited

U.S. PATENT DOCUMENTS

| | | |
|---|---|---|
| 7,313,402 B1 | 12/2007 | Rahman et al. |
| 7,397,424 B2 | 7/2008 | Houri |
| 7,856,234 B2 | 12/2010 | Alizadeh-Shabdiz et al. |

(Continued)

FOREIGN PATENT DOCUMENTS

| | | |
|---|---|---|
| WO | 2013/184383 | 12/2013 |
| WO | WO 2013/184384 | 12/2013 |

OTHER PUBLICATIONS

Abdelhaq et al., EvenTweet: Online Localized Event Detection from Twitter. 2013.*

(Continued)

*Primary Examiner* — Syed H Hasan
(74) *Attorney, Agent, or Firm* — Fish & Richardson P.C.

(57) ABSTRACT

Crowd-sourced localized application usage data is collected from mobile devices at a usage location and sent to a network-based service. The network-based service analyzes the data to determine a single most relevant application correlated to the usage location. Once the most relevant application is determined, a recommendation for the application is sent to client devices operating at the usage location. In some implementations the data is processed to determine whether the usage location is a chained venue, a large venue or an event. Once the usage location has been determined, the most relevant application can be selected for recommendation.

14 Claims, 9 Drawing Sheets

(56) References Cited

U.S. PATENT DOCUMENTS

| | | | |
|---|---|---|---|
| 7,899,583 B2 | 3/2011 | Mendelson | |
| 7,924,149 B2 | 4/2011 | Mendelson | |
| 8,054,219 B2 | 11/2011 | Alizadeh-Shabdiz | |
| 8,223,074 B2 | 7/2012 | Alizadeh-Shabdiz | |
| 8,369,264 B2 | 2/2013 | Brachet et al. | |
| 8,386,422 B1 | 2/2013 | Kadous | |
| 8,478,297 B2 | 7/2013 | Morgan et al. | |
| 8,818,324 B1 | 8/2014 | Hines, III et al. | |
| 8,836,580 B2 | 9/2014 | Mendelson | |
| 8,866,673 B2 | 10/2014 | Mendelson | |
| 8,896,485 B2 | 11/2014 | Mendelson | |
| 8,941,485 B1 | 1/2015 | Mendelson | |
| 8,983,493 B2 | 3/2015 | Brachet et al. | |
| 9,020,687 B2 | 4/2015 | Mendelson | |
| 9,204,251 B1 | 12/2015 | Mendelson | |
| 9,204,257 B1 | 12/2015 | Mendelson | |
| 2005/0071350 A1 | 3/2005 | Artale | |
| 2007/0016373 A1 | 1/2007 | Hunter et al. | |
| 2009/0060352 A1 | 3/2009 | Distante et al. | |
| 2010/0069035 A1 | 3/2010 | Johnson | |
| 2010/0198814 A1 | 8/2010 | Petersen | |
| 2011/0018732 A1 | 1/2011 | Cho | |
| 2011/0093492 A1 | 4/2011 | Sull et al. | |
| 2011/0105150 A1* | 5/2011 | Moon | H04W 4/001 455/456.3 |
| 2011/0179449 A1 | 7/2011 | Ganesan et al. | |
| 2011/0307354 A1 | 12/2011 | Erman et al. | |
| 2011/0307478 A1 | 12/2011 | Pinckney et al. | |
| 2011/0320307 A1* | 12/2011 | Mehta | G06Q 30/0282 705/26.7 |
| 2012/0021771 A1 | 1/2012 | Gupta et al. | |
| 2012/0021774 A1 | 1/2012 | Mehta et al. | |
| 2012/0029817 A1 | 2/2012 | Khorashadi et al. | |
| 2012/0036507 A1 | 2/2012 | Jonnala et al. | |
| 2012/0042036 A1 | 2/2012 | Lau et al. | |
| 2012/0064855 A1 | 3/2012 | Mendelson | |
| 2012/0066035 A1 | 3/2012 | Stanger et al. | |
| 2012/0101976 A1 | 4/2012 | Flinn et al. | |
| 2012/0110174 A1 | 5/2012 | Wootton et al. | |
| 2012/0134548 A1 | 5/2012 | Rhoads et al. | |
| 2012/0143878 A1 | 6/2012 | Fendley et al. | |
| 2013/0225202 A1 | 8/2013 | Shim | |
| 2013/0283283 A1 | 10/2013 | Wang | |
| 2014/0036099 A1 | 2/2014 | Balassanian et al. | |
| 2014/0073345 A1 | 3/2014 | Chintalapudi et al. | |
| 2014/0348013 A1 | 11/2014 | Terrenoir et al. | |
| 2014/0365119 A1 | 12/2014 | Haverinen et al. | |
| 2015/0126215 A1 | 5/2015 | Pandey et al. | |
| 2015/0141056 A1 | 5/2015 | Fefilatyev et al. | |
| 2015/0172864 A1 | 6/2015 | Fabrikant et al. | |
| 2015/0339631 A1* | 11/2015 | Hodges | G06Q 10/1053 705/319 |
| 2015/0347474 A1 | 12/2015 | Mondragon et al. | |
| 2015/0348076 A1 | 12/2015 | Mondragon et al. | |
| 2015/0350830 A1 | 12/2015 | Lin et al. | |
| 2015/0350844 A1 | 12/2015 | Agarwal | |
| 2016/0034515 A1 | 2/2016 | Katragadda et al. | |
| 2016/0094951 A1 | 3/2016 | Yang et al. | |
| 2016/0094954 A1 | 3/2016 | Millman et al. | |
| 2016/0357768 A1 | 12/2016 | Strong et al. | |

OTHER PUBLICATIONS

International Search Report and Written Opinion in International Application No. PCT/US2015/032698 dated Aug. 6, 2015, 8 pages.

* cited by examiner

"MOST RELEVANT APPLICATION RECOMMENDATION BASED ON CROWD-SOURCED APPLICATION USAGE DATA"

CROSS-REFERENCE TO RELATED APPLICATION

This application claims priority to U.S. Provisional Application No. 62/005,967, entitled "Most Relevant Application Recommendation Based on Crowd-Sourced Application Usage Data," filed May 30, 2014, the entire contents of which are incorporated herein by reference.

TECHNICAL FIELD

This disclosure relates generally to using crowd-sourced data for location-based services.

BACKGROUND

Modern mobile devices (e.g., smart phones, computer tablets, wearable computers) are capable of running a variety of applications, including applications for business, education, finance and entertainment. Leading mobile device manufacturers such as Apple Inc., provide a digital distribution platform that allows users to browse and download applications. The applications can be downloaded directly to the mobile device and automatically installed. It is common for users to download applications that are relevant to their current geographic location. For example, when shopping at a retail store or attending an event, the user may desire to use an application that is relevant to the store or event to learn of promotions or retrieve other relevant information. Since the advent of digital distribution platforms for mobile devices there have been millions of applications developed for distribution. The large number of applications makes it difficult for a user to choose a most relevant application for a particular location.

SUMMARY

Crowd-sourced, localized application usage data is collected from mobile devices at a particular location (hereafter referred to as "usage location") and sent to a network-based service. The network-based service analyzes the data to determine a single most relevant application correlated to the usage location. Once the most relevant application is determined, a recommendation for the application is sent to client devices operating at the usage location. In some implementations the data is processed to determine whether the usage location is a chained venue, a large venue or an event. Once the usage location has been determined, the most relevant application can be selected for recommendation.

In some implementations, a method comprises: receiving, at a server computer, localized application usage data collected at a usage location from mobile devices; determining a set of applications that are most relevant to the usage location based on the localized application usage data; identifying the usage location as a large venue, chained venue or event; and selecting a single application from the set of applications as most relevant to the usage location based on the identifying.

Other implementations are directed to systems, devices and non-transitory, computer-readable, storage mediums. Particular implementations disclosed herein provide one or more of the following advantages. Users are provided with a notification of a single application that is most relevant to a usage location, thus avoiding the time consuming process of searching for a most relevant application on a digital distribution platform.

The details of the disclosed implementations are set forth in the accompanying drawings and the description below. Other features, objects and advantages are apparent from the description, drawings and claims.

DESCRIPTION OF DRAWINGS

The same reference symbol used in various drawings indicates like elements.

DETAILED DESCRIPTION

Example Systems

Figure 1:
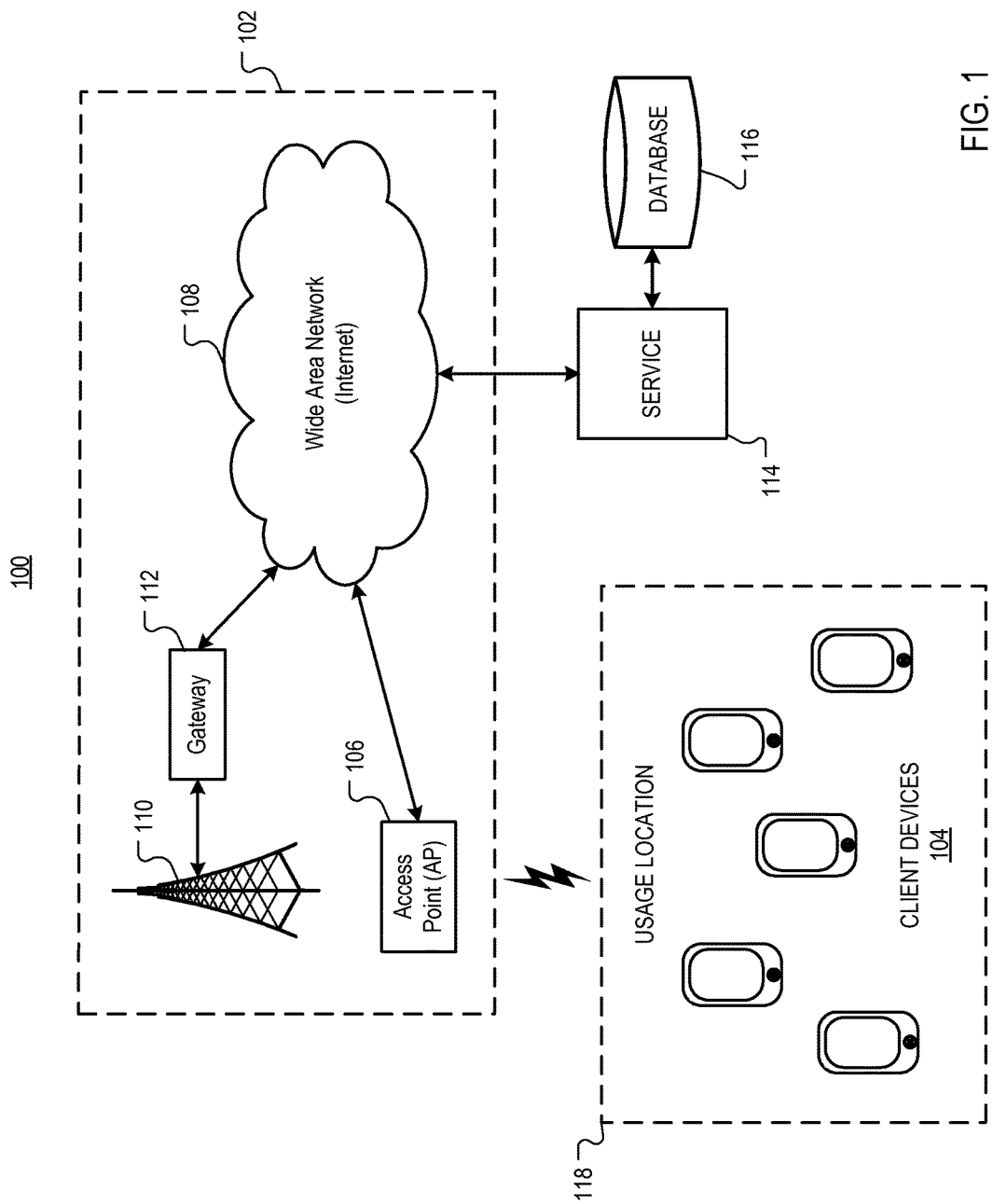
FIG. 1 illustrates an example system for correlating a most relevant application to a usage location.

FIG. 1 illustrates an example system 100 for correlating a most relevant application to a usage location 118. In some implementations, system 100 can include wireless network 102, client devices 104, network-based service 114 (e.g., map service) and database 116. Wireless network 102 further includes access point 106, cell tower 110, gateway 112 and wide area network 108 (e.g., the Internet). System 100 is a conceptual diagram useful for describing the disclosed implementations. In practice, system 100 can include any number of access points, cell towers, gateways, network-based services, databases and client devices.

Client devices 104 can be any wireless communication device, including but not limited to smart phones, tablet computers and wearable computers. Service 114 can include one or more server computers and other infrastructure for communicating with client devices 104 over wide area network 108. Service 114 can access database 116 to read and write map data to support map services provided to client devices 104. For example, database 116 can include a road network model that represents features (e.g., nodes, links and areas) and properties (e.g., location coordinates, shape, addresses, road class and speed range) of road networks. Database 116 can also store other data associated with the road network, including but not limited to POIs. The road network model and POI data can be used by service 114 to provide various map services to applications running on client devices 104, including but not limited to navigation, friend tracking and other location-based applications.

In some implementations, crowd-sourced, localized application usage data is collected from client devices 104 and sent to service 114 where the data is analyzed as described in reference to FIGS. 5-8. The crowd-sourced, localized application usage data can be collected by client devices 104 using, for example, a data collection daemon running as a background process on client devices 104. In some implementations, the users of client devices 104 are required to "opt in" to allow sending of application usage data to service 114. The application usage data can be encrypted or otherwise made anonymous at client devices 104 before sending to service 114.

In some implementations, application usage is tagged with location data and application usage data (correlating an application and usage location). For example, application usage data are collected from client devices 104 and include location data, time data and an application identifier (ID). An application usage record may be created for each measurement event (use of a particular application at a particular location and/or time). In some implementations, an application usage record can be the tuple <LOCATION DATA, TIME DATA, APP ID>. Application usage records can be aggregated on client devices 104 and sent to service 114 as a single transmission. An example submission can include:

```
{      <L₁, t₁, A₁>
       <L₂, t₂, A₁>
       <L₂, t₂, A₂>
       ...
       <Lₓ, tᵧ, A_z>
}.
```

The first application usage record $<L_1, t_1, A_1>$ indicates that Application $A_1$ was used at approximately time $t_1$ at location $L_1$. The second application usage record $<L_2, t_2, A_1>$ indicates that application $A_1$ was used at approximately time $t_2$ at location $L_2$. The third application usage record $<L_2, t_2, A_2>$ indicates that application $A_2$ was used at approximately time $t_2$ at location $L_2$. Locations $L_1$, $L_2$, $L_3$ and $L_x$ may have a corresponding timestamp for when the location was determined, such as times $t_{L1}$, $t_{L2}$, $t_{L3}$ and $t_{Lx}$. For example, time $t_{L1}$ may be approximately the same as time $t_1$ if the location was determined at approximately the same time as the application event. In another example, the difference between times $t_{L1}$ and $t_1$ represents a time between an application event and when the location was determined.

Location data may comprise geographic coordinates (e.g., latitude and longitude) or any other suitable data that describes the location of a client device. Location data may be approximate. Location may be determined at the device using any suitable location determination technology, including by trilateration of radio frequency signals (e.g., cellular, WiFi) and Global Navigation Satellite System (GNSS) receivers, such as Global Positioning System (GPS) receivers embedded or coupled to client devices 104. In some implementations, one or more location determination methods can be used together.

A best known location and location timestamp may be stored for each of one or more location determination methods. In some implementations, a set of best known GPS location, WiFi location and cellular location and associated timestamps may be stored (e.g., stored in an array) in client devices 104.

Figure 2:
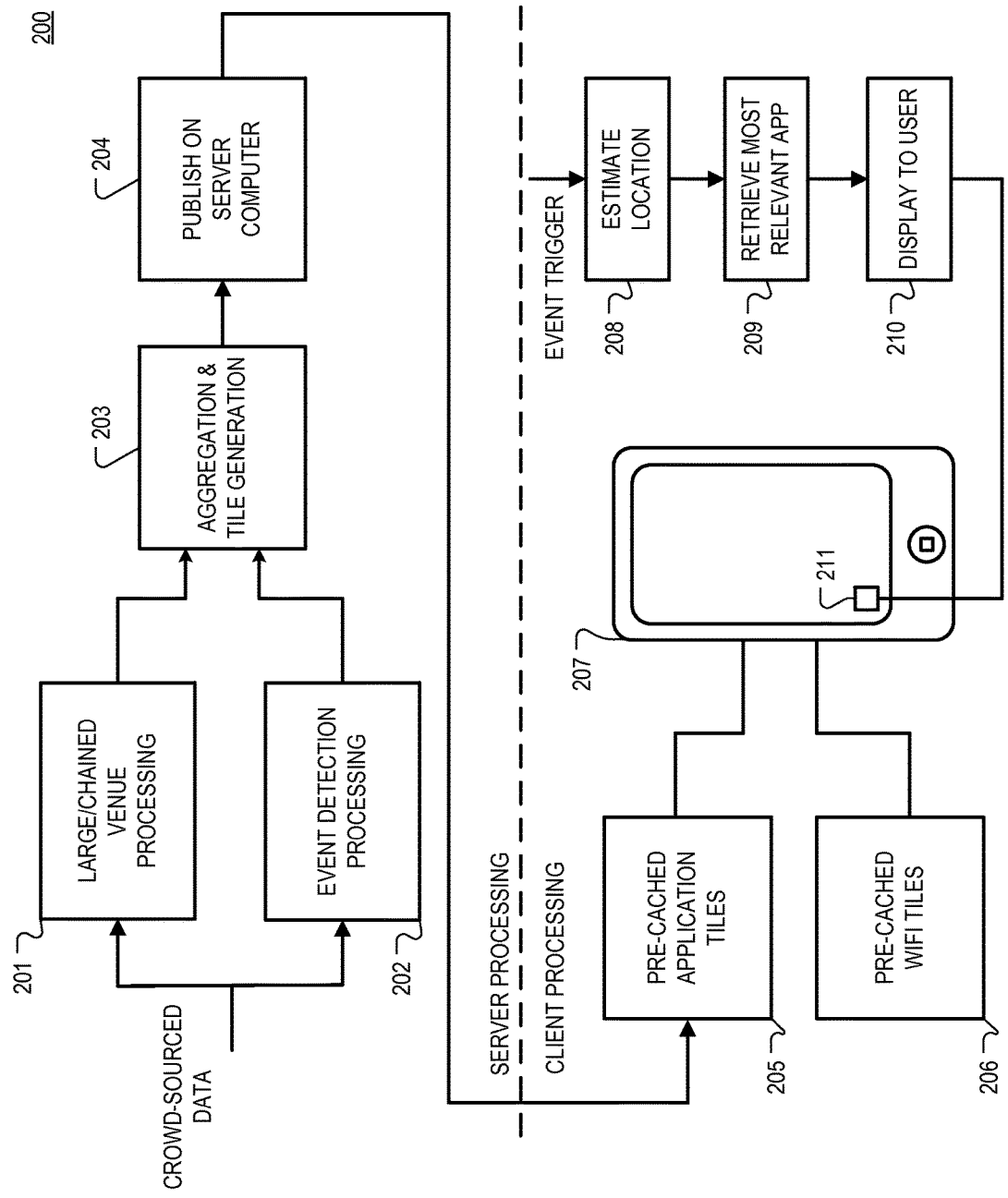
FIG. 2 is a conceptual block diagram of an example process for correlating application usage to a usage location including identifying the usage location as a large/chained venue or event.

FIG. 2 is a conceptual block diagram of an example process 200 for correlating application usage to a usage location including identifying the usage location as a large venue, chained venue or event. Process 200 includes determining a single most relevant application correlated to usage location. Process 200 includes server side processing and client side processing as indicated by the dashed line.

Referring to server processing in FIG. 2, crowd-sourced, localized application usage data is input into large/chained venue processing 201 and event detection processing 202. Processes 201, 202 determine whether the usage location is a large or chained venue or an event, respectively. Processes 201, 202 are described in more detail in reference to FIGS. 5-8. Some examples of large venues include but are not limited to: museums, schools, stores/malls, airports, transit stations, businesses, etc. Some examples of chained venues (e.g., franchised businesses) can include but are not limited to: retail stores (e.g., Target®), coffee shops (e.g., Starbucks®), bank branch stores (e.g., BankofAmerica®) and any other business that has multiple or "chain" stores. Some examples of events can include conferences, festivals, sports events and any other gathering of individuals with a strong correlation to application usage.

The outputs of large/chained venue processing 201 and event processing 202 are aggregated and application tiles are generated 203 that include data (e.g., application IDs) for relevant applications that correlate with usage locations included in the tiles. The tiles can then be published 204 on one or more server computers for download to client devices as pre-cached application tiles 205. Example architectures for server computers and client devices are described in reference to FIGS. 9 and 10.

Referring to client processing in FIG. 2, client device 207 (e.g., a smart phone) receives the published application tiles 205 and WiFi tiles 206. WiFi tiles 206 include estimated locations of WiFi access points that can be used by client device 207 to compute its position using WiFi positioning technology. In response to a trigger event, one or more processors of client device 207 estimate the current location 208 of client device 207 using a positioning technology (e.g., GPS, WiFi, cellular) and retrieve the most relevant application data 209 from an application tile data corresponding to the current location of client device 207. An example trigger event can be a manual trigger event performed by a user such as, for example, the user unlocking their client device from a "lock screen" state. Trigger events may also be initiated by an application or operating system running on client device 207 or remotely by a network-based service.

After the most relevant application is retrieved from the application tile data, the most relevant application is displayed 210 on a display screen of client device 207. For example, icon 211 representing the most relevant application can appear on the display screen (e.g., in the lower left hand corner of the screen), which the user can select/touch to download the most relevant application from a digital distribution platform. In some implementations the application may already be installed on client device 207, in which case selection of icon 211 results in the most relevant application being launched on client device 207.

Figure 3:
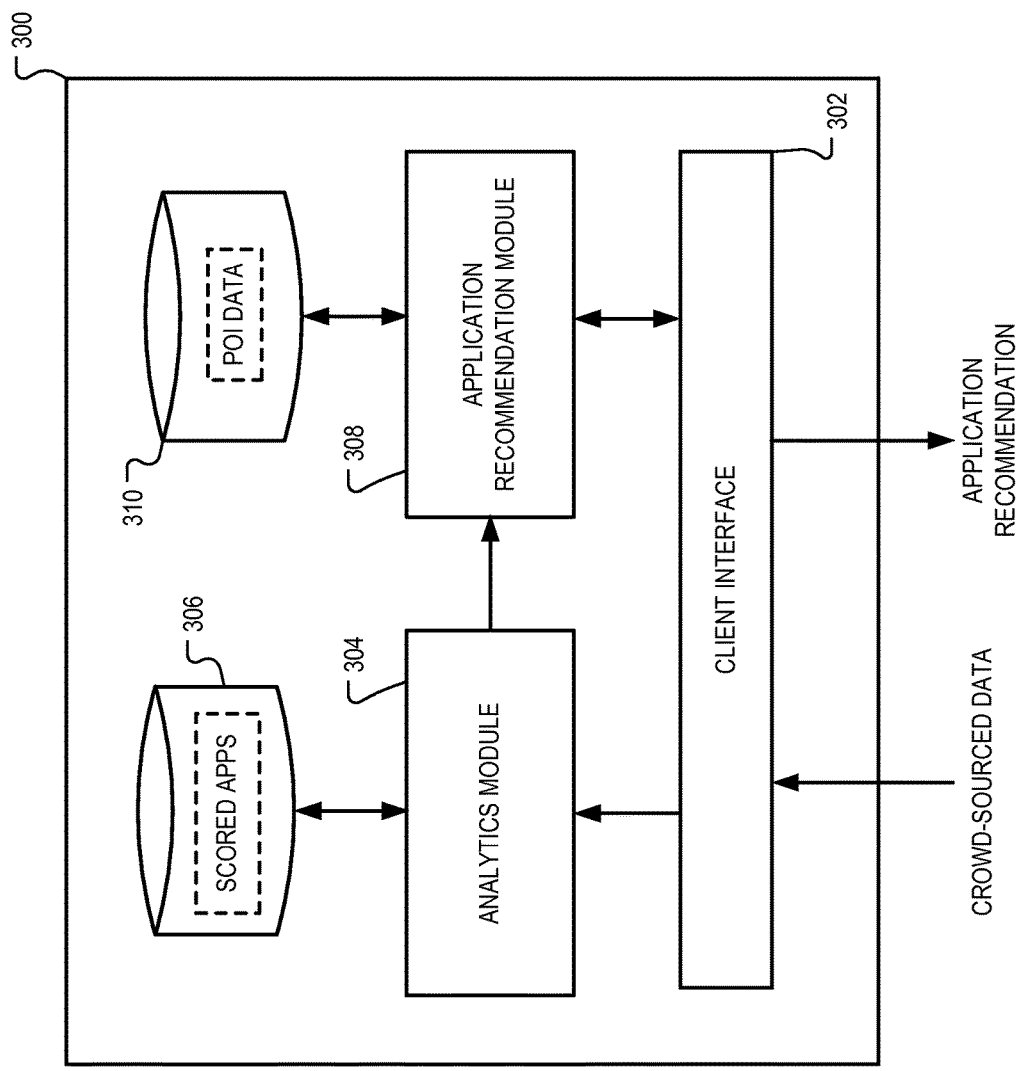
FIG. 3 is a conceptual block diagram of a system implemented in a server computer for correlating a most relevant application to a usage location.

FIG. 3 is a conceptual block diagram of system 300 implemented in a server computer for correlating a most relevant application to a usage location. In some implementations, system 300 can include client interface 302, analytics module 304, analytics database 306, application recommendation module 308 and POI database 310. System 300 can be implemented on one or more server computers operated by service 114, each of which may have server computer architecture 1000 described in reference to FIG. 10.

Crowd-sourced, localized application usage data is received through client interface 302 and forwarded to analytics module 304. In some implementations, client interface 302 decimates the application usage data in space and time to reduce the resolution of the data. Analytics module 304 takes the decimated application usage data, determines the application and location associated with each individual application and increments a counter for the identified application of a bin corresponding to a grid of locations covering a domain of interest (e.g., a city). For example, a geographic region of interest can be divided into a grid of 1000×1000 usage locations $L_j$ and each grid cell being 1/1000 degree$^2$, where j is the number of usage locations in the grid.

Analytics module 304 operates on the raw bin count to determine an estimated intensity of application usage at usage locations. In some implementations, analytics module 304 can use the aggregated device usage data to generate a predictive model for device population. Analytics module 304 can use the estimated intensity of application usage at the given locations and output from the predictive model for device population to calculate an application score for each application. The application scores can be used by analytics module 304 to determine a space-time localized ranking of applications. A set of applications relevant to a usage location are ranked according to their respective application scores and stored in database 306.

Further details of the processes performed by analytics module 304 described above can be found in International Application No. PCT/US2013/042483, filed May 23, 2013, for "App Recommendation Using Crowd-Sourced Localized App Usage Data," which International Application is incorporated by reference herein in its entirety.

Application recommendation module 308 can take the set of ranked applications and perform large/chained venue processing 201 and/or event detection processing 202, as described in reference to FIGS. 5-8. The output of application recommendation module 308 is a single most relevant application for a given usage location. Data for the most relevant application is included in an application tile and published on one or more server computers which are accessible by client devices 104 operating at the usage location. When a user with a client device is physically present at a large or chained venue or attends an event, an icon or graphical object can be displayed on the client device that indicates that an application that is most relevant to large/chained venue or event is available. The user can select the icon to download and install the application or launch the application if previously installed.

Figure 4:
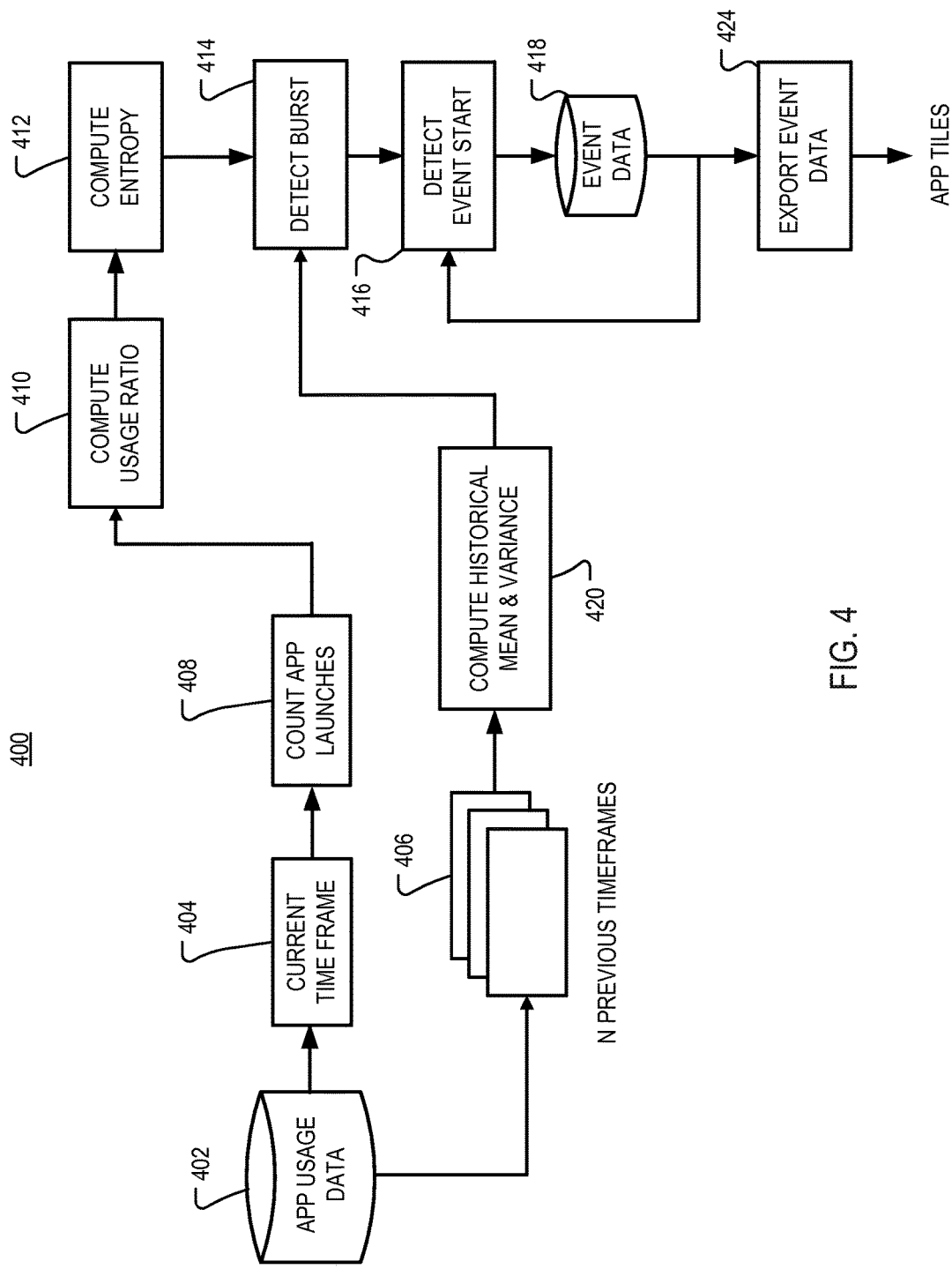
FIG. 4 is a conceptual block diagram of an example event detection system for detecting events based on crowd-sourced, localized application usage data.

FIG. 4 is a conceptual flow diagram of example event process 400 for detecting events based on crowd-sourced, localized application usage data. In some implementations, a current timeframe 404 of crowd-sourced application usage data 402 for a grid cell of usage locations taken from an m×m grid of usage locations is processed to determine application launch counts 408 for the cell. A usage ratio is computed 410 for each application in the cell by dividing the application's launch count by the total number of application launch counts for the cell. For each application in the m×m grid, the application's spatial entropy 412 is computed by normalizing the application's usage ratio by the total number of usage ratios for the grid. The spatial entropy provides a measure of whether the application's usage is localized or spread over a wide area. Applications with widespread usage are usually not relevant to an event (e.g., Facebook® application).

For each cell, a z-score is computed from the usage ratios and a historical mean and variance computed 420 from N previous frames 406 of crowd-sourced data 402. A "burst" is detected 414 for the cell if the z-score and the application launch count for the cell exceed threshold values. If the total number of application launches in a cell is bursty and there is at least one locally "bursty" application (e.g., as defined by the spatial entropy being less than a given threshold value), an event start is detected 416 for the cell and the current time frame 404. If an event is detected 416 for the cell, then each locally bursty application in the cell is stored as event data 418. In some implementations, event data 418 are used to determine if an event has ended. For example, an end of an event is detected if no locally bursty applications are added to the event data 418 for a given period of time.

Each locally bursty application stored in the event data 418 is individually scored and the application with the highest score is selected as the most relevant application for the event. The most relevant application is exported 424 for download to client devices in an application tile.

In some implementations, noise in process 400 can be reduced using one or more filters that are applied when events are exported 424 to application tiles. For example, application usage 402 data can be used to filter out applications that have high estimated intensity of usage in more than k usage locations or the current usage location for more than d days. In some implementations, to improve processing speed, applications with low usage counts (e.g., less than 5) are not exported. In some implementations, the spatial entropy 412 and historical mean and variance 420 are computed only for applications that can become bursty in the current timeframe 404 (e.g., the maximum per cell application launch is greater than a threshold value).

Example Processes

Figure 5:
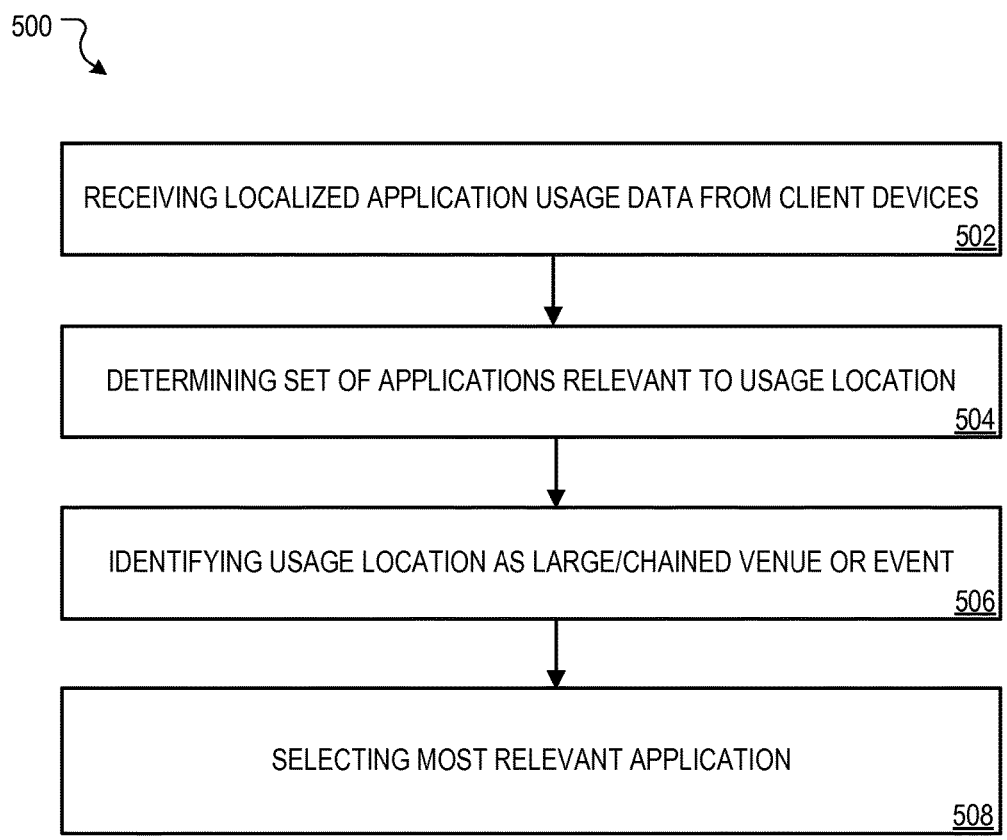
FIG. 5 is a flow diagram of example process of correlating a most relevant application to a usage location.

FIG. 5 is a flow diagram of example process 500 of correlating a most relevant application to a usage location. In some implementations, process 500 can be implemented by one or more server computers having server computer architecture 1000 described in reference to FIG. 10.

In some implementations, process 500 begins by receiving crowd-sourced, localized application usage data from client devices (502). For example, users of client devices can opt in to allow anonymous localized application usage data to be sent to a network-based service for processing. The data can be collected as a background process (e.g., daemon) on the device.

Process 500 can continue by determining a set of applications relevant to the usage location (504). For example, the crowd-sourced localized application usage data can be used to estimate and score application usage intensity at the usage location and generate an ordered list of relevant applications for the usage location based on application scores, as described in International Application No. PCT/US2013/042483.

Figure 6:
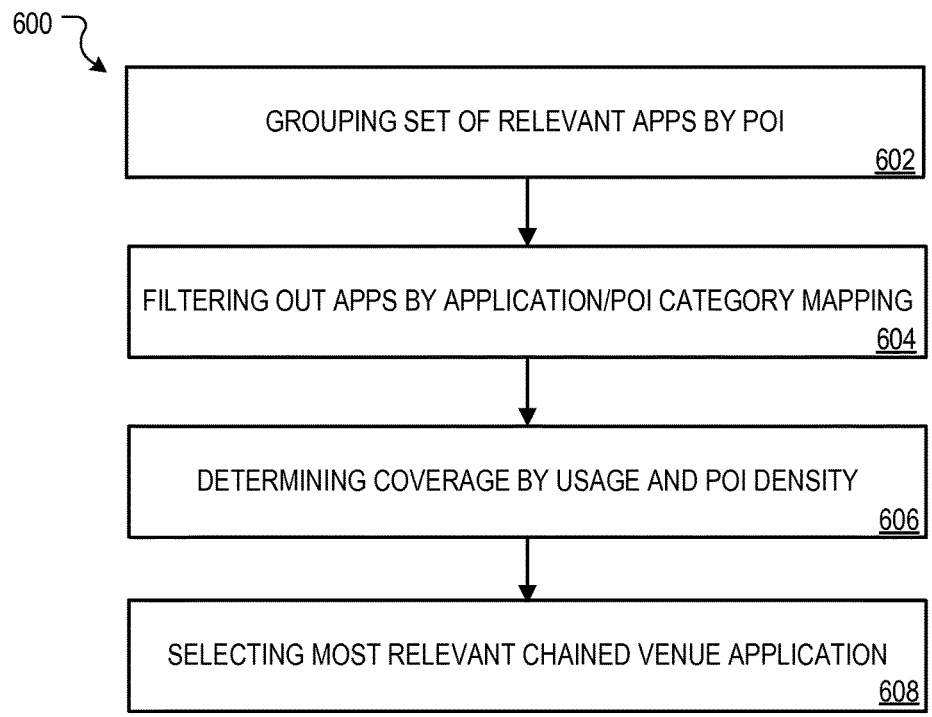
FIG. 6 is a flow diagram of example process of correlating a most relevant application to a chained venue.
Figure 7:
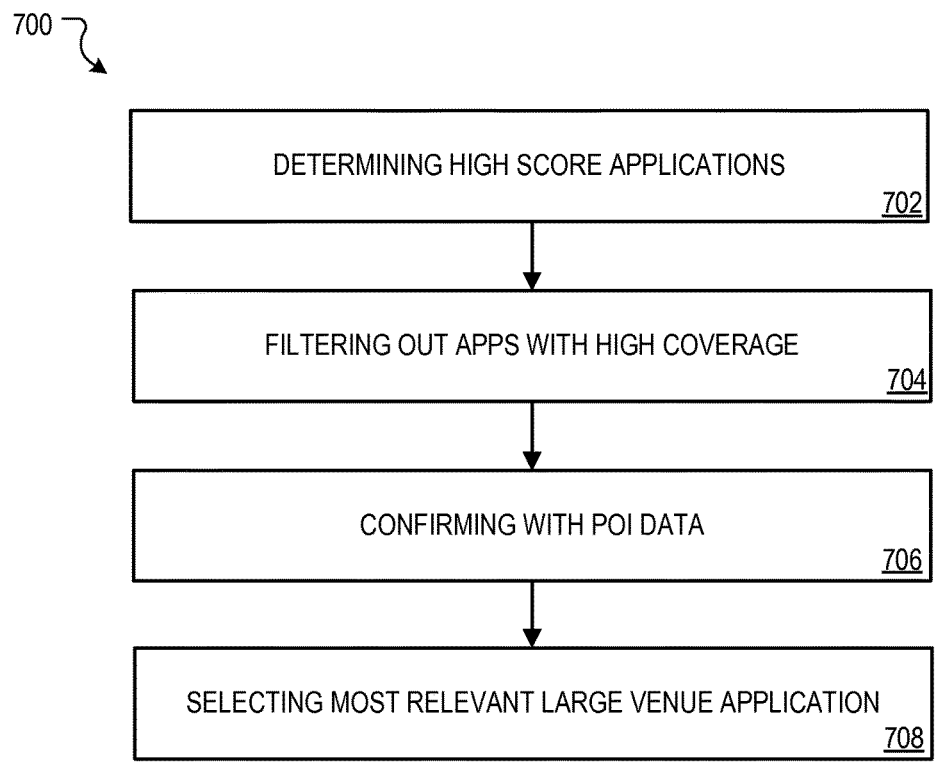
FIG. 7 is a flow diagram of example process of correlating a most relevant application to a large venue.
Figure 8:
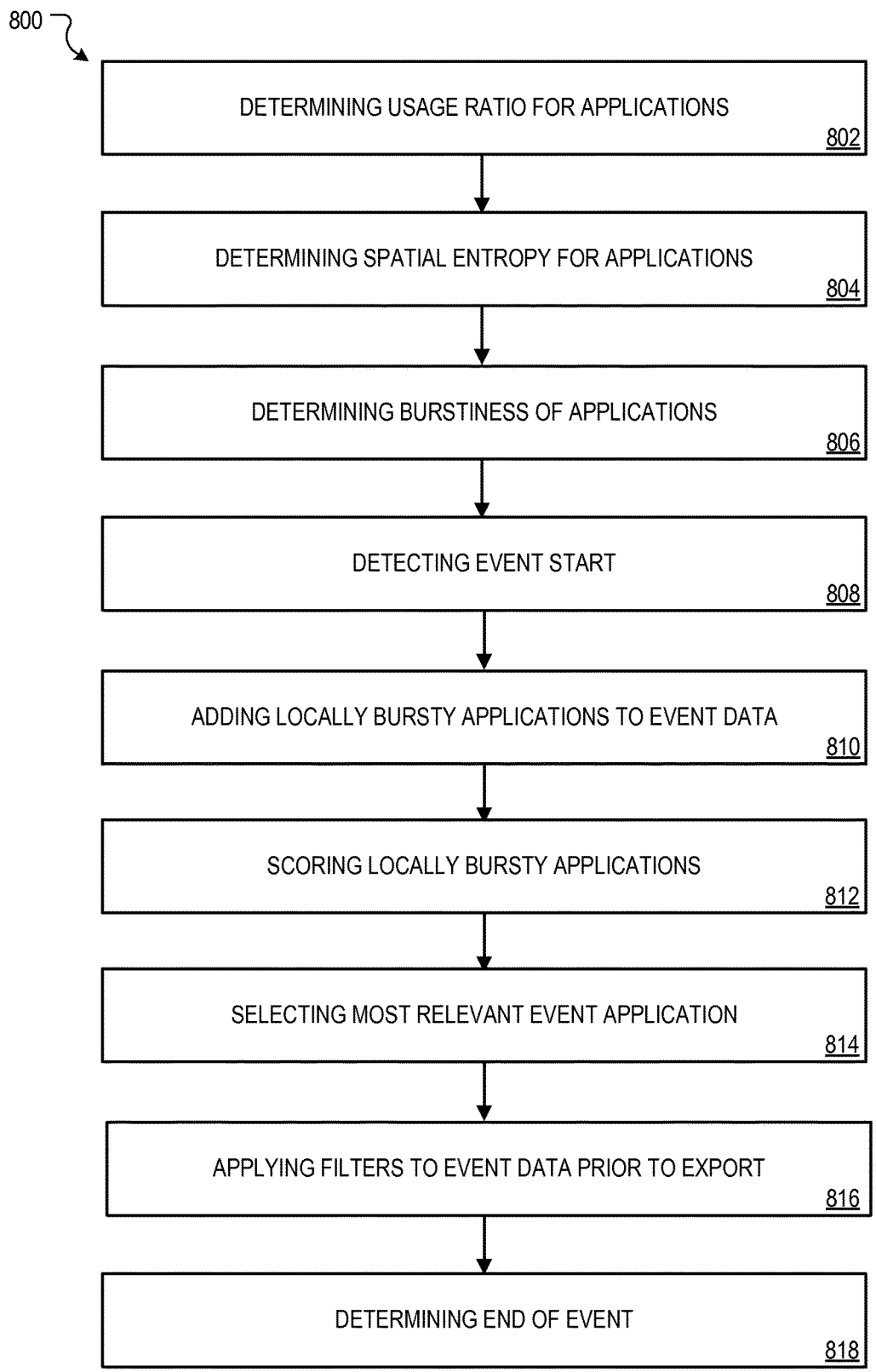
FIG. 8 is a flow diagram of example process of correlating a most relevant application to an event.

Process 500 can continue by identifying a usage location as a large venue, chained venue or event (506), as described in reference to FIGS. 6-8. Process 500 can continue by selecting a single application from the set of relevant applications that is most relevant to the usage location (508).

FIG. 6 is a flow diagram of example process 600 of correlating a most relevant application to a chained venue. In some implementations, process 600 can be implemented by one or more server computers having server computer architecture 1000 described in reference to FIG. 10.

In some implementations, process 600 begins by grouping a set of relevant applications by POI (602). For example, a map database can be divided into n×n grids (e.g., 50 m×50 m grids). POIs in the map database are grouped into the n×n grids by a usage location key <latitude, longitude>, where each location key has a corresponding value that includes a list of POIs located in the n×n grid. A list of relevant applications correlated to a reduced m×m grid (e.g., 150 m×150 m) of usage locations are grouped by POI names taken from the map database. The list of relevant applications can be a list of scored applications, as described in International Application No. PCT/US2013/042483.

The POI and application lists are compared and POIs and applications having the same usage location key <latitude, longitude> are formed into <app, POI> pairs. For example, crowd-sourced usage data for a Starbucks® application may form a large cluster, such as a 5×5 grid, 4×5 grid or one continuous usage area around a Starbucks® POI. This large cluster can be reduced in size into a smaller $m_r \times m_r$ grid. If the Starbucks® POI n×n grid is inside the $m_r \times m_r$ grid, the pair <Starbucks® app, Starbucks® POI> can be determined for the Starbucks® application and Starbucks® POI. An application having a launch count (raw bin count) that is less than a threshold (e.g., 5) is assumed not to be a chained venue and the application is excluded from further chained venue processing.

Based on the <app, POI> pairs, and for each application, each paired POI is scored. The POI score can be calculated by dividing the number of POIs (the number of POIs resulting from the pairing step) by the total number of POIs from the map database. For example, assuming there are 12,000 Starbucks® POIs in the map database and there are 8,000 Starbucks® app clusters that have a Starbucks® POI nearby (has a <Starbucks® app, Starbucks® POI> pair), the POI score is 8,000/12,000 or 0.67. The POI scores are sorted (e.g., sorted in descending order), resulting in a sorted list of POI scores for each application. For example, sorting POI scores for an application "App1" that pairs with three POIs (App1-POI1, App1-POI2, App1-POI3), results in an array of POI scores, App1(POI1 score1, POI2 score2, POI3 score3), where score1 is greater than score2, score2 is greater than score3, etc.

Next, a reverse of the above process is performed. Based on the <app, POI> pairs, and for each POI, every application is scored. The application scores can be calculated by dividing the number of applications resulting from the pairing step by the total number of applications in the $m_r \times m_r$ grid of locations. For example, if there are 10,000 Starbucks® application usage clusters in the entire world, then 10,000 is the total number of applications. Assuming 8000 Starbucks® app clusters have a Starbucks® POI nearby (has a <Starbucks® app, Starbucks® POI> pair), the application score will be 8000/10000 or 0.8. The application scores are sorted (e.g., sorted in descending order), resulting in a list of sorted POI scores for each application. For example, sorting application scores for POI "POI1" that pairs with three applications (App1-POI1, App2-POI1, App3-POI1), produces an array of application scores, POI1(App1 score1, App2 score2, App3 score3), where score1 is greater than score2, score2 is greater than score3, etc.

Next, the lists of POIs and applications ordered by score in the previous two steps are compared. If the names of the POIs and applications match, a POI/application relation is identified and added to a POI/application relation list.

Process 600 can continue by filtering out applications in the POI/application relation list using application/POI category mapping (604). In some implementations, an application/POI mapping table can be used to filter out noise from the chained venue POI/application relation list by removing POI/application relations that have mismatched categories. For example, an application assigned to an application category "Education" is a good match to a POI assigned to a POI category "POI_University." But an application assigned to an application category "Restaurants" is a poor match to a POI assigned to the POI category "POI_University," and the relation would be removed from the POI/application relation list.

Process 600 can continue by determining coverage and POI density (606). For each usage location, and using the usage location key <latitude, longitude>, a list of POIs in the map database is identified. For each of the POIs in the list, the POI/Application relation list is searched to determine if the application is a chained venue application (608). If the application is a chained venue application (608), the application is selected as the single most relevant application to the usage location.

In practice, the coverage area of interest ($m_r \times m_r$ grid) can be large (covering tens of n×n grids). For example, a Starbucks® store can be 25 m×25 m and a coverage area for a Starbucks® application can be 200 m×200 m. The application scores described in reference to FIG. 3 can be used to reduce the coverage area to only recommend a Starbucks® application at a Starbucks® store. For example, a percentage (filterPerct) of the maximum application score for a set of relevant applications for the usage location can be calculated to reduce the coverage area for the Starbucks® application. However, the coverage area may be different for a city and a small town which typically have different POI densities. For example, a city will have many Starbucks® located in a small area versus a small town that may have only one or two Starbucks® for the entire town. To address this issue, a number of POIs within a specified radius of the application usage location are counted. Based on the number of POIs within the radius, filterPerct is increased. For example, filtPerct=base_filterPerct+delta_filterPerct, where base_filterPerct is a baseline percentage (e.g., 60%), which is increased by delta_filterPerct (e.g., 5%). Accordingly, filtPerct for a large city will increase, resulting in a reduced coverage area.

In some implementations, crowd-sourced app usage data used in process 600 and described in International Application No. PCT/US2013/042483, can be used to correct POI location data in a POI database used by a map application. For example, crowd-sourced app usage data (e.g., latitude, longitude, App ID, speed, direction, timestamp) can be used together with other location data from other sources to correct a POI location. In some implementations, the usage location key <latitude, longitude> can be compared with the POI location data in the POI database to determine if there is a match. If there is no match, then it is likely that the POI location data is inaccurate. The usage location key <latitude, longitude> can be used to correct the POI location data.

FIG. 7 is a flow diagram of an example process 700 of correlating a most relevant application to a large venue. In some implementations, process 700 can be implemented by one or more server computers having server computer architecture 1000 described in reference to FIG. 10.

In some implementations, process 700 begins by determining high score applications from a set of applications that are relevant to a usage location (702). These applications can be provided based on application scores indicating highly localized estimated usage intensity, as described in International Application No. PCT/US2013/042483.

Process 700 can continue by filtering out applications with high coverage (704). For example, for each m×m grid of usage locations, only "outstanding" applications will survive filtering, where "outstanding" means that either the application score is greater than a FACTOR times the second highest application score for the grid or has an application score that is greater than an absolute high value (e.g., 1.0) for the grid. FACTOR can have a default value for most application categories and a different value for certain other categories. For example, applications in the Education category could be assigned a lower FACTOR than the default FACTOR.

Process 700 can continue by confirming the usage location as a large venue using POI data (706). For example, for each usage location, a list of POIs correlated to the usage location is obtained. For each of the POIs in the list, the application's title, developer name and description can be used to match the POI with an application. For eastern Asian languages, part of the POI name can be used to match with an application. For example, the first x characters of the POI name may match with the application title and/or developer name. For other languages, tokenized keywords can be used to match POIs and applications. The POI confirmation result can be exact match (100% match), partial match or no match.

Process 700 can continue by selecting a single application from the set of applications that is the most relevant large venue application (708). Based on the filtered result from the previous filtering step, a number of filtered applications correlated to the large venue are counted. To be qualified as a most relevant application, the count should be greater than a grid_count. A grid_count may be different by category and POI confirmation result. If the POI confirmation result is an exact match, the grid_count will be small (e.g., 2 for default POI category). If the POI confirmation result is a partial match, the grid_count is medium (e.g., 9 for default POI category). If the POI confirmation results in no match, the grid_count will be large (e.g., 16 for default POI category). In some implementations, the grid_count can be adjusted for a favorite POI category. The application having an application usage count that is greater than the grid_count will be the most relevant large venue application. The output of this step can be latitude, longitude plus the most relevant application, where the latitude and longitude define the center coordinates of the usage location.

For each application usage location, the latitude and longitude plus the most relevant application can be used to match the large venue most relevant application cache. If it matches, the application usage area is displayed after the coverage is reduced. To reduce the coverage, a percentage filter filterPerct can be used as previously described for chained venues. The application score should be greater than filterPerct times the maximum application usage score for the usage location.

FIG. 8 is a flow diagram of an example process 800 of correlating a most relevant application to an event. In some implementations, process 800 can be implemented by one or more server computers having server computer architecture 1000 described in reference to FIG. 10.

In some implementations, process 800 begins by determining a usage ratio for each application in a grid cell for a current timeframe (802). For example, a current timeframe of crowed-sourced application usage data for a grid cell of usage locations taken from an m×m grid of usage locations is processed to determine launch counts for each application launched in the cell. The usage ratio for a given application is computed by dividing the application's launch count by the total number of application launch counts for the cell.

Process 800 can continue by determining a spatial entropy H for each application in the cell (804). The spatial entropy for a given application is computed by normalizing the usage ratio for the application by the total number of usage ratios for the cell. The spatial entropy for an application determines if the application's usage is localized or spread over a wide area. Applications with high entropy have widespread use (e.g., Facebook® application) and therefore are usually not relevant to an event.

Process 800 can continue by determining a burstiness of each local application in the cell (806). For example, for each application in the cell, a z-score is computed from the usage ratio and a historical mean and variance computed from N previous frames of application usage data. A "burst" is detected for a given application in the cell if the z-score and the application launch count for the cell exceed threshold values. For example, $Z_{score}(app, c) > \tau$ and $u(app, c) > N_b$.

The z-score is defined mathematically in Equation [1]:

$$Z_{score}(app, c) = \frac{u(app, c) - \mu}{\sigma}, \quad [1]$$

where c is the current timeframe, u(app, c) is the normalized usage ratio for the application for the current timeframe c, and μ and σ are the mean and variance, respectively of the application usage data taken from the last N timeframes. For application usage observed for the first time, μ=σ=0. For applications having σ=0, a prior noise level, $$\sigma = \frac{u(app, c)}{r}$$

is assumed where r is positive integer >0 (e.g., 3). To model noise, it is assumed that the application usage data are drawn from a Gaussian distribution with mean μ and standard deviation σ. The mean and standard deviation are estimated from the application usage data using a maximum likelihood function.

Process 800 can continue by detecting an event start for the cell for the current timeframe (808). For example, if the total number of application launches in a cell is bursty and there is at least one locally bursty application (as defined by the spatial entropy being less than a given threshold value), an event start is detected for the cell for the current time frame. If an event is detected for the cell, then each locally bursty application in the cell is added to a data store of event data (810).

Process 800 can continue by scoring locally bursty applications (812). For example, each locally bursty application in the event data is individually scored and the application with the highest score is selected as the most relevant application for the event (814). The most relevant application is exported for download to client devices in an application tile. A burst score is defined mathematically in Equation [2]:

$$Burst_{score}(app, c) = \frac{Z_{score}(app, c) * u(app, c)}{H(app, c)}. \quad [2]$$

In some implementations, noise in process 800 can be reduced using one or more filters that are applied to the applications in the event data prior to exporting the applications to application tiles (816). For example, application usage data can be used to filter out applications that have high estimated intensity of usage in more than k usage locations or the current usage location for more than d days. In some implementations, to improve processing speed, applications with low usage counts (e.g., less than 5) are not exported. In some implementations, the spatial entropy and historical mean and variance are computed only for applications that can become bursty in the current timeframe (e.g., the maximum per cell application launch is greater than a threshold value).

Process 800 can continue by determining the end of an event (818). For example, an end of an event is detected if no locally bursty applications are added to the event data for a given period of time.

Example Client Architecture

Figure 9:
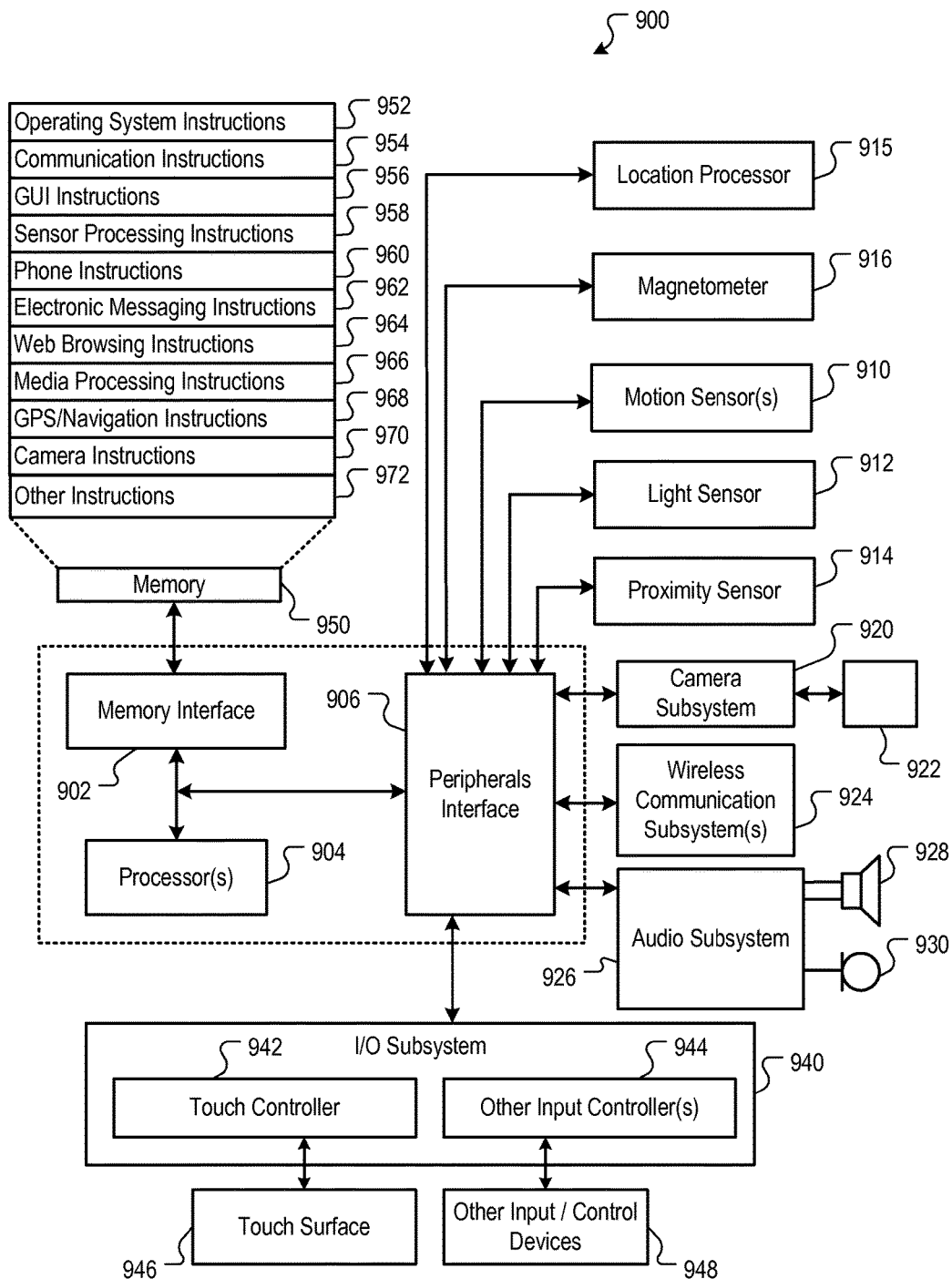
FIG. 9 is a block diagram of example client device architecture for implementing the features and processes described in reference to FIGS. 1-8.

FIG. 9 is a block diagram of example client device architecture 900 for implementing the features and processes described in reference to FIGS. 1-8. Architecture 900 may be implemented in any mobile device for generating the features described in reference to FIGS. 1-8, including but not limited to portable computers, smart phones and tablet computers, game consoles, wearable computers and the like. Architecture 900 may include memory interface 902, data processor(s), image processor(s) or central processing unit(s) 904, and peripherals interface 906. Memory interface 902, processor(s) 904 or peripherals interface 906 may be separate components or may be integrated in one or more integrated circuits. One or more communication buses or signal lines may couple the various components.

Sensors, devices, and subsystems may be coupled to peripherals interface 906 to facilitate multiple functionalities. For example, motion sensor 910, light sensor 912, and proximity sensor 914 may be coupled to peripherals interface 906 to facilitate orientation, lighting, and proximity functions of the device. For example, in some implementations, light sensor 912 may be utilized to facilitate adjusting the brightness of touch surface 946. In some implementations, motion sensor 910 (e.g., an accelerometer, gyros) may be utilized to detect movement and orientation of the device. Accordingly, display objects or media may be presented according to a detected orientation (e.g., portrait or landscape).

Other sensors may also be connected to peripherals interface 906, such as a temperature sensor, a biometric sensor, or other sensing device, to facilitate related functionalities.

Location processor 915 (e.g., GPS receiver chip) may be connected to peripherals interface 906 to provide georeferencing. Electronic magnetometer 916 (e.g., an integrated circuit chip) may also be connected to peripherals interface 906 to provide data that may be used to determine the direction of magnetic North. Thus, electronic magnetometer 916 may be used as an electronic compass.

Camera subsystem 920 and an optical sensor 922, e.g., a charged coupled device (CCD) or a complementary metal-oxide semiconductor (CMOS) optical sensor, may be utilized to facilitate camera functions, such as recording photographs and video clips.

Communication functions may be facilitated through one or more communication subsystems 924. Communication subsystem(s) 924 may include one or more wireless communication subsystems. Wireless communication subsystems 924 may include radio frequency receivers and transmitters and/or optical (e.g., infrared) receivers and transmitters. Wired communication systems may include a port device, e.g., a Universal Serial Bus (USB) port or some other wired port connection that may be used to establish a wired connection to other computing devices, such as other communication devices, network access devices, a personal computer, a printer, a display screen, or other processing devices capable of receiving or transmitting data.

The specific design and implementation of the communication subsystem 924 may depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, 802.x communication networks (e.g., Wi-Fi, Wi-Max), code division multiple access (CDMA) networks, NFC and a Bluetooth™ network. Wireless communication subsystems 924 may include hosting protocols such that the device may be configured as a base station for other wireless devices. As another example, the communication subsystems may allow the device to synchronize with a host device using one or more protocols, such as, for example, the TCP/IP protocol, HTTP protocol, UDP protocol, and any other known protocol.

Audio subsystem 926 may be coupled to a speaker 928 and one or more microphones 930 to facilitate voice-enabled functions, such as voice recognition, voice replication, digital recording, and telephony functions.

I/O subsystem 940 may include touch controller 942 and/or other input controller(s) 944. Touch controller 942 may be coupled to a touch surface 946. Touch surface 946 and touch controller 942 may, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with touch surface 946. In one implementation, touch surface 946 may display virtual or soft buttons and a virtual keyboard, which may be used as an input/output device by the user.

Other input controller(s) 944 may be coupled to other input/control devices 948, such as one or more buttons, rocker switches, thumb-wheel, infrared port, USB port, and/or a pointer device such as a stylus. The one or more buttons (not shown) may include an up/down button for volume control of speaker 928 and/or microphone 930.

In some implementations, device 900 may present recorded audio and/or video files, such as MP3, AAC, and MPEG video files. In some implementations, device 900 may include the functionality of an MP3 player and may include a pin connector for tethering to other devices. Other input/output and control devices may be used.

Memory interface 902 may be coupled to memory 950. Memory 950 may include high-speed random access memory or non-volatile memory, such as one or more magnetic disk storage devices, one or more optical storage devices, or flash memory (e.g., NAND, NOR). Memory 950 may store operating system 952, such as Darwin, RTXC, LINUX, UNIX, OS X, WINDOWS, or an embedded operating system such as VxWorks. Operating system 952 may include instructions for handling basic system services and for performing hardware dependent tasks. In some implementations, operating system 952 may include a kernel (e.g., UNIX kernel).

Memory 950 may also store communication instructions 954 to facilitate communicating with one or more additional devices, one or more computers or servers, including peer-to-peer communications. Communication instructions 954 may also be used to select an operational mode or communication medium for use by the device, based on a geographic location (obtained by the GPS/Navigation instructions 968) of the device. Memory 950 may include graphical user interface instructions 956 to facilitate graphic user interface processing, including a touch model for interpreting touch inputs and gestures; sensor processing instructions 958 to facilitate sensor-related processing and functions; phone instructions 960 to facilitate phone-related processes and functions; electronic messaging instructions 962 to facilitate electronic-messaging related processes and functions; web browsing instructions 964 to facilitate web browsing-related processes and functions; media processing instructions 966 to facilitate media processing-related processes and functions; GPS/Navigation instructions 968 to facilitate GPS and navigation-related processes; camera instructions 970 to facilitate camera-related processes and functions; and other instructions 972 for performing some or all of the processes, as described in reference to FIGS. 1-8.

Each of the above identified instructions and applications may correspond to a set of instructions for performing one or more functions described above. These instructions need not be implemented as separate software programs, procedures, or modules. Memory 950 may include additional instructions or fewer instructions. Furthermore, various functions of the device may be implemented in hardware and/or in software, including in one or more signal processing and/or application specific integrated circuits (ASICs).

Example Server Architecture

Figure 10:
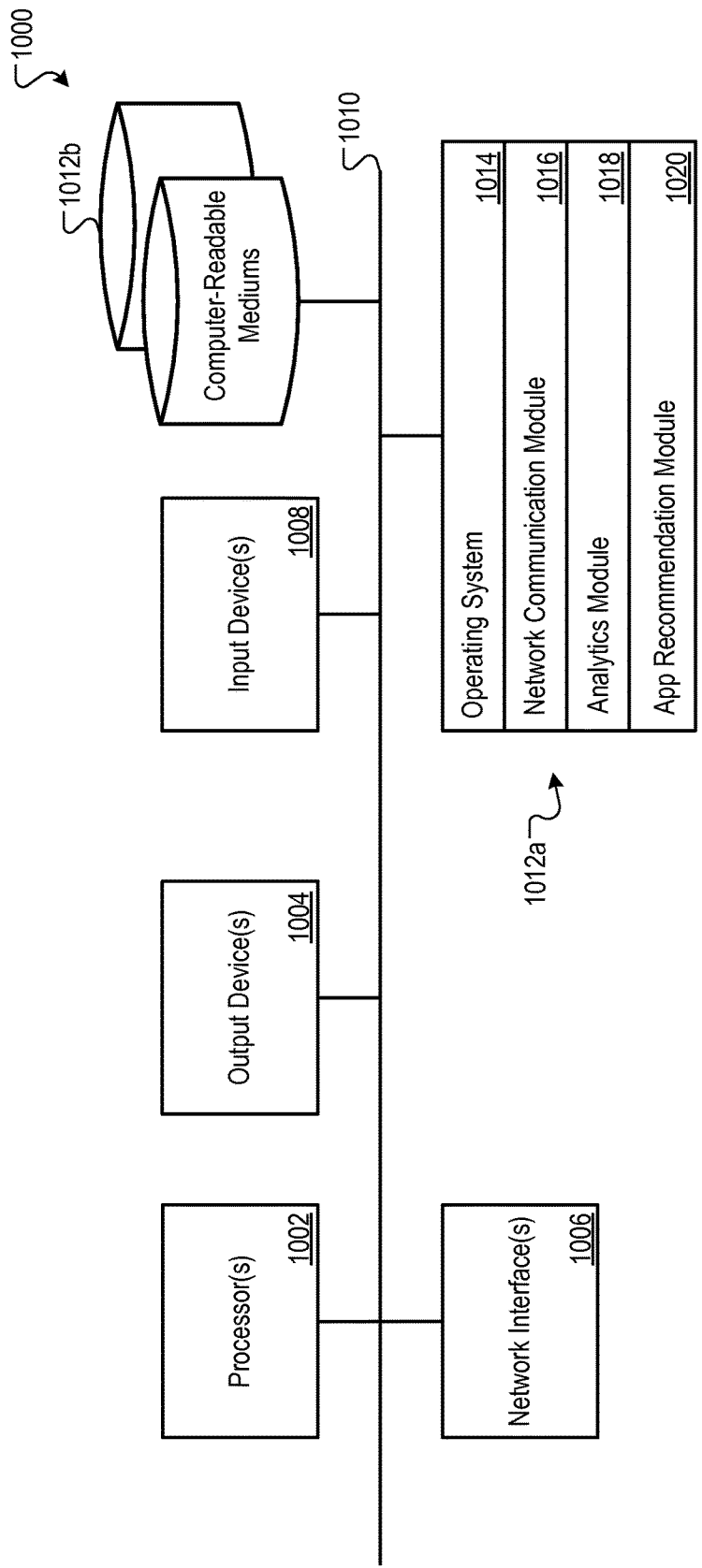
FIG. 10 is a block diagram of example server computer architecture for implementing the features and processes described in reference to FIGS. 1-8.

FIG. 10 is a block diagram of example server computer architecture 1000 for implementing the features and processes described in reference to FIGS. 1-8. Other architectures are possible, including architectures with more or fewer components. In some implementations, architecture 1000 includes one or more processors 1002 (e.g., dual-core Intel® Xeon® Processors), one or more output devices 1004 (e.g., LCD), one or more network interfaces 1006, one or more input devices 1008 (e.g., mouse, keyboard, touch-sensitive display) and one or more computer-readable mediums 1012a-b (e.g., RAM, ROM, SDRAM, hard disk, optical disk, flash memory, etc.). These components can exchange communications and data over one or more communication channels 1010 (e.g., buses), which can utilize various hardware and software for facilitating the transfer of data and control signals between components.

The term "computer-readable medium" refers to any medium that participates in providing instructions to processor 1002 for execution, including without limitation, non-volatile media (e.g., optical or magnetic disks), volatile media (e.g., memory) and transmission media. Transmission media includes, without limitation, coaxial cables, copper wire and fiber optics.

Computer-readable mediums 1012a-b can further include operating system 1014 (e.g., Mac OS® server, Windows® NT server), network communication module 1016, analytics module 1018 and map services module 1020. Operating system 1014 can be multi-user, multiprocessing, multitasking, multithreading, real time, etc. Operating system 1014 performs basic tasks, including but not limited to: recognizing input from and providing output to devices 1006, 1008; keeping track and managing files and directories on computer-readable mediums 1012a-b (e.g., memory or a storage device); controlling peripheral devices; and managing traffic on the one or more communication channels 1010. Network communications module 1016 includes various components for establishing and maintaining network connections (e.g., software for implementing communication protocols, such as TCP/IP, HTTP, etc.). Analytics module 1018 and application recommendation module 1020 perform statistical analysis on localized application usage data, including one or more of the analyses described in International Application No. PCT/US2013/042483 and International Publication No. WO 2013/184383 A2, for "App Recommendation Using Crowd-Sourced Localized App Usage Data."

Architecture 1000 can be included in any computer device, including one or more server computers each having one or more processing cores. Architecture 1000 can be implemented in a parallel processing or peer-to-peer infrastructure or on a single device with one or more processors. Software can include multiple software components or can be a single body of code.

The features described may be implemented in digital electronic circuitry or in computer hardware, firmware, software, or in combinations of them. The features may be implemented in a computer program product tangibly embodied in an information carrier, e.g., in a machine-readable storage device, for execution by a programmable processor; and method steps may be performed by a programmable processor executing a program of instructions to perform functions of the described implementations by operating on input data and generating output.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with an author, the features may be implemented on a computer having a display device such as a CRT (cathode ray tube) or LCD (liquid crystal display) monitor for displaying information to the author and a keyboard and a pointing device such as a mouse or a trackball by which the author may provide input to the computer.

The features may be implemented in a computer system that includes a back-end component, such as a data server or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include a LAN, a WAN and the computers and networks forming the Internet.

The computer system may include clients and servers. A client and server are generally remote from each other and typically interact through a network. The relationship of client and server arises by virtue of computer programs running on the respective computers and having a client-server relationship to each other.

One or more features or steps of the disclosed embodiments may be implemented using an Application Programming Interface (API). An API may define on or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

As described above, some aspects of the subject matter of this specification include gathering and use of data available from various sources to improve services a mobile device can provide to a user. The present disclosure contemplates that in some instances, this gathered data may identify a particular location or an address based on device usage. Such personal information data can include location-based data, addresses, subscriber account identifiers, or other identifying information.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

In the case of advertisement delivery services, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

A number of implementations have been described. Nevertheless, it will be understood that various modifications may be made. Elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
   receiving, at a server computer and from a plurality of mobile devices, anonymous, localized application usage data correlated to a usage location where the mobile devices are operating;
   determining a set of applications that are relevant to the usage location based on the anonymous, localized application usage data;
   correlating the set of applications with point-of-interest (POI) data associated with a chained venue based on the usage location, wherein the chained venue is one of multiple venues that share a brand;

identifying the usage location as the chained venue based on the correlating;
selecting an application for the chained venue from the set of applications based on the identifying; and
sending, by the server computer to a client device operating at the usage location, a link to the chained venue application.

2. The method of claim 1, wherein identifying the usage location as a chained venue, further comprises:
pairing POIs with the set of applications based on usage location to generate application-POI pairings;
for each application in an application-POI pairing, determining a POI score for each POI based on a number of times the POI is included in a pairing;
creating a first list of POI scores for each application; application based on a number of times the application is included in a pairing;
for each POI in an application-POI pairing, determining an application score for each
creating a second list of application scores for each POI;
comparing the first and second lists to determine names of applications and POIs that match;
creating a third list of applications and POIs with matching names; and
identifying the usage location as a chained venue based on the third list of applications and POIs with matching names.

3. The method of claim 2, further comprising:
comparing names of matched applications and POIs in the third list with category names; and
filtering out the matched applications and POIs that have names that do not match the category names.

4. The method of claim 2, wherein comparing the first and second lists further comprises:
sorting the first list by POI score;
sorting the second list by application score; and
comparing the sorted first and second lists to determine names of applications and POIs that match.

5. The method of claim 1, further comprising:
calculating a percentage of a maximum application score for the set of relevant applications for the usage location; and
reducing a usage area for one or more applications in the set of applications based on the calculated percentage.

6. A method comprising:
receiving, at a server computer and from a plurality of mobile devices, anonymous, localized application usage data correlated to a usage location where the mobile devices are operating;
determining a set of applications that are relevant to the usage location based on the anonymous, localized application usage data;
identifying the usage location as an event location by:
determining a usage ratio for each application in the set of applications;
determining a spatial entropy for each application in the set of applications based on its respective usage ratio;
determining a local burstiness score for each application in the set of applications based on its respective usage ratio and spatial entropy;
detecting an event start based on the local burstiness scores;
selecting an event application from the set of applications based on its local burstiness score; and
sending, by the server computer to a client device operating at the usage location, a link to the event application.

7. The method of claim 6, further comprising:
determining an end of the event by monitoring the collective local burstiness of the set of applications over a period of time.

8. A system comprising:
one or more processors;
memory including instructions, which, when executed by the one or more processors, cause the one or more processors to perform operations comprising:
receiving, from a plurality of mobile devices, anonymous, localized application usage data correlated to a usage location where the mobile devices are operating;
determining a set of applications that are relevant to the usage location based on the anonymous, localized application usage data;
correlating the set of applications with point-of-interest (POI) data associated with a chained venue based on the usage location, wherein the chained venue is one of multiple venues that share a brand;
identifying the usage location as the chained venue based on the correlating;
selecting an application for the chained venue from the set of applications based on the identifying; and
sending to a client device operating at the usage location, a link to the chained venue application.

9. The system of claim 8, wherein identifying the usage location as a chained venue, further comprises:
pairing POIs with the set of applications based on usage location to generate application-POI pairings;
for each application in an application-POI pairing, determining a POI score for each POI based on a number of times the POI is included in a pairing;
creating a first list of POI scores for each application;
for each POI in an application-POI pairing, determining an application score for each application based on a number of times the application is included in a pairing;
creating a second list of application scores for each POI;
comparing the first and second lists to determine names of applications and POIs that match;
creating a third list of applications and POIs with matching names; and
identifying the usage location as a chained venue based on the third list of applications and POIs with matching names.

10. The system of claim 9, the operations further comprising:
comparing names of matched applications and POIs in the third list with category names; and
filtering out the matched applications and POIs that have names that do not match the category names.

11. The system of claim 9, wherein comparing the first and second lists further comprises:
sorting the first list by POI score;
sorting the second list by application score; and
comparing the sorted first and second lists to determine names of applications and POIs that match.

12. The system of claim 8, the operations further comprising:
calculating a percentage of a maximum application score for the set of relevant applications for the usage location; and
reducing a usage area for one or more applications in the set of applications based on the calculated percentage.

13. A system comprising:
one or more processors;
memory including instructions, which, when executed by the one or more processors, cause the one or more processors to perform operations comprising:
   receiving, from a plurality of mobile devices, anonymous, localized application usage data correlated to a usage location where the mobile devices are operating;
   determining a set of applications that are relevant to the usage location based on the anonymous, localized application usage data;
   identifying the usage location as an event location by:
      determining a usage ratio for each application in the set of applications;
      determining a spatial entropy for each application in the set of applications based on its respective usage ratio;
      determining a local burstiness score for each application in the set of applications based on its respective usage ratio and spatial entropy;
      detecting an event start based on the local burstiness scores;
   selecting an event application from the set of applications based on its local burstiness score; and
   sending, to a client device, operating at the usage location, a link to the event application.

14. The system of claim 13, the operations further comprising:
determining an end of the event by monitoring a local burstiness of the set of applications over a period of time.

* * * * *